United States Patent
Wilson

(10) Patent No.: US 8,000,048 B2
(45) Date of Patent: Aug. 16, 2011

(54) MAGNETIC RECORDING DISK AND DISK DRIVE WITH TRACK IDENTIFICATION USING PHASE-TYPE SERVO PATTERNS

(75) Inventor: Bruce Alexander Wilson, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 0 days.

(21) Appl. No.: 12/634,240

(22) Filed: Dec. 9, 2009

(65) Prior Publication Data

US 2011/0134565 A1  Jun. 9, 2011

(51) Int. Cl.
*G11B 5/09* (2006.01)
(52) U.S. Cl. ........................................ 360/48; 360/77.07
(58) Field of Classification Search .................... None
See application file for complete search history.

(56) References Cited

U.S. PATENT DOCUMENTS

| | | | |
|---|---|---|---|
| 5,521,929 A | 5/1996 | Weng et al. | |
| 6,754,016 B2 | 6/2004 | Messner et al. | |
| 7,095,580 B2 | 8/2006 | Ehrlich et al. | |
| 7,167,329 B2 * | 1/2007 | Baker | 360/55 |
| 7,206,148 B2 * | 4/2007 | Ehrlich | 360/49 |
| 7,612,961 B2 | 11/2009 | Yamamoto | |

* cited by examiner

*Primary Examiner* — Jason C Olson
(74) *Attorney, Agent, or Firm* — Thomas R. Berthold

(57) ABSTRACT

A magnetic recording disk drive has a disk with a head positioning servo pattern of multiple circumferentially-spaced chevron patterns of discrete patterned servo islands. The disk drive has servo electronics that decodes the chevron patterns to determine the absolute radial position of the head without the need for separate track identification fields. The chevron pattern with the smallest radial period has a radial period P1 and each of the other chevron patterns has a period which is a unique multiple of P1. In one embodiment the first chevron pattern read by the head has period P1 and each successive chevron pattern read by the head has a period that is greater than the period of the chevron pattern immediately preceding it such that the period of each chevron pattern progressively increases.

14 Claims, 12 Drawing Sheets

MAGNETIC RECORDING DISK AND DISK DRIVE WITH TRACK IDENTIFICATION USING PHASE-TYPE SERVO PATTERNS

BACKGROUND OF THE INVENTION

1. Field of the Invention

This invention relates generally to magnetic recording disks, including patterned-media disks wherein each data bit is stored in a magnetically isolated data island on the disk, and more particularly to a disk and disk drive with patterned phase-type servo patterns for head-positioning.

2. Description of the Related Art

Conventional magnetic recording disk drives use disks with "continuous" media, meaning that the magnetic recording layer is a continuous film of magnetizable material. In conventional continuous-media disks the concentric data tracks are not physically separated from one another and are not pre-formed in the recording layer, but are formed when the write fields from the write head create the magnetizations in the continuous magnetic layer. A continuous-media disk may also be a "discrete-track" disk, meaning that the concentric data tracks of continuous magnetic material are radially separated from one another by concentric nonmagnetic guard bands.

Magnetic recording hard disk drives with patterned magnetic recording media have been proposed to increase the data density. In patterned media, the magnetic recording layer on the disk is patterned into small isolated data islands such that there is a single magnetic domain in each island or "bit". The single magnetic domains can be a single grain or consist of a few strongly coupled grains that switch magnetic states in concert as a single magnetic volume. This is in contrast to conventional continuous media wherein a single "bit" may have multiple magnetic domains separated by domain walls. To produce the required magnetic isolation of the patterned islands, the magnetic moment of the spaces between the islands must be destroyed or substantially reduced so as to render these spaces essentially nonmagnetic. Alternatively, the patterned media may be fabricated so that that there is no magnetic material in the spaces between the islands.

Like conventional non-patterned or continuous-media disks and discrete-track disks, patterned-media disks also have nondata servo regions that are used for read/write head positioning. The nondata servo regions in patterned-media disks contain patterned discrete servo blocks or islands separated by nonmagnetic spaces. The servo islands form a servo pattern that generates a servo readback signal that is demodulated into a position error signal (PES) for positioning the read/write head to the desired data track and maintaining it on track. The proposed method for formatting this type of disk is to DC "erase" the disk during manufacturing with a large magnet, leaving all of the servo islands magnetized in the same direction. Thus for a perpendicular magnetic recording disk, all of the servo islands would have a magnetization direction either "into" or "out of" the surface of the disk.

In patterned media, the data sectors as well as the nondata servo regions are patterned. However, it is also possible to fabricate a continuous-media disk wherein just the nondata servo regions are patterned. This type of continuous-media disk may have either conventional concentric data tracks, or discrete data tracks separated by nonmagnetic guard bands, but the nondata servo regions are patterned. An example of a discrete-track disk with patterned servo regions is described in U.S. Pat. No. 4,912,585.

One type of servo pattern is a phase-type servo pattern with PES fields that form "chevron" patterns. A chevron pattern is a first set of circumferentially-spaced servo islands inclined relative to the data tracks and a second set of servo islands that is the mirror image of the first set and circumferentially spaced from the first set about a generally radial line of symmetry. As the two sets of servo islands in the chevron pattern pass the read head, two sinusoidal readback signals are generated and the phase difference between the two sinusoidal signals is demodulated into the radial position of the read head relative to the nearest track centerline. However, this type of conventional phase-type servo pattern still requires a separate track identification (TID) field, typically a Gray-coded pattern, that must be read and decoded to determine the absolute position of the read head.

What is needed is a magnetic recording disk and disk drive with a chevron servo pattern of discrete patterned servo islands that can be demodulated to determine the absolute position of the read head without the need for a separate TID field.

SUMMARY OF THE INVENTION

The invention relates to a magnetic recording disk having a servo pattern of multiple circumferentially-spaced chevron patterns of discrete patterned servo islands. The invention also relates to disk drive with servo electronics that decodes the servo pattern to determine the absolute radial position of the head without the need for separate TID fields. The first chevron pattern (preferably the first one to be read by the head) has a radial period P1 and each of the other chevron patterns has a period which is a unique multiple of P1. Preferably, the first chevron pattern is the one with the smallest radial period P1 and each successive chevron pattern has a period that is greater than the period of the pattern immediately preceding it such that the period of each chevron pattern progressively increases. The period P1 is preferably equal to an integer multiple of the data track spacing or track pitch Tp, preferably 4Tp or 2Tp. In one embodiment the period of each chevron pattern is a fixed integer times the period of the chevron pattern immediately preceding it. In another embodiment the chevron patterns other than the chevron pattern with radial period P1 all have periods which are just slightly greater than P1, preferably by a multiple which is a ratio of two integers that are relatively prime to one another, i.e., two integers that share no factors in common, such as 8/7. In still another embodiment, the chevron patterns other than the chevron pattern with radial period P1 all have periods which are a unique integer multiple of P1, wherein these integers are relatively prime to one another, i.e., the unique integers share no factors in common.

The magnetic recording disk with the servo pattern of multiple circumferentially-spaced chevron patterns according to the invention may be a patterned-media disk with both patterned data tracks and patterned servo regions, a continuous-media disk with conventional continuous-media data tracks and patterned servo regions, or a continuous-media disk with discrete data tracks and patterned servo regions.

For a fuller understanding of the nature and advantages of the present invention, reference should be made to the following detailed description taken together with the accompanying figures.

DETAILED DESCRIPTION OF THE INVENTION

Figure 1:
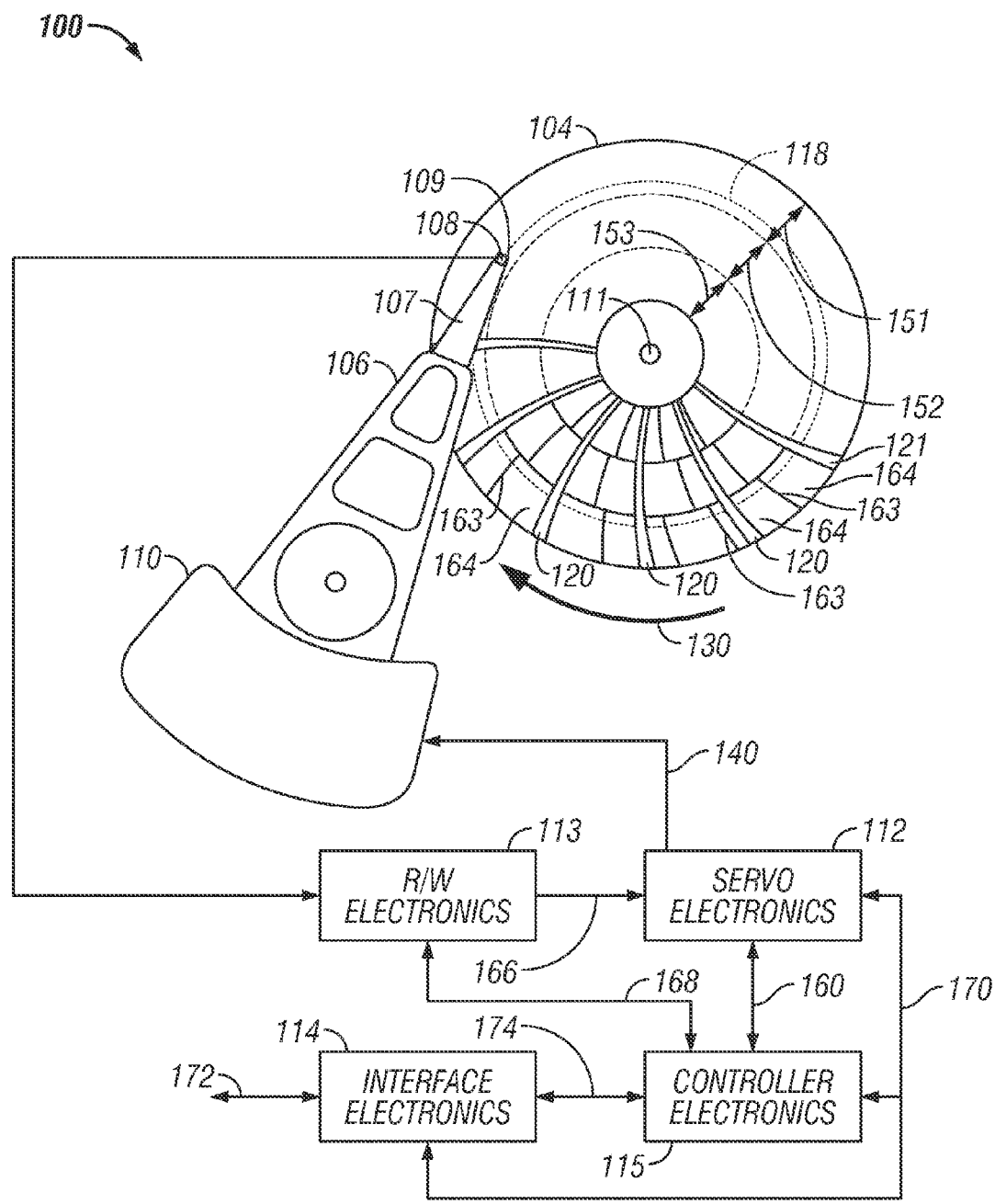
FIG. 1 is a schematic of a conventional magnetic recording disk drive illustrating the magnetic recording disk with nondata servo sectors and synchronization fields.

FIG. 1 is a schematic of a conventional magnetic recording disk drive and illustrates the magnetic recording disk with the nondata regions, specifically the servo sectors for positioning the recording heads on the data tracks and the synchronization fields for enabling the recording heads to read and write data in the data sectors. The disk drive, designated generally as 100, includes the magnetic recording disk 104, a voice coil motor (VCM) actuator 110, an actuator arm 106, a suspension 107, a head carrier or air-bearing slider 108 and a recording head 109. The recording head 109 is typically a combination of an inductive write head with a magnetoresistive read head (also called a read/write head) and is located on the trailing end or end face of slider 108. Slider 108 is supported on the actuator arm 106 by a suspension 107 that enables the slider to "pitch" and "roll" on an air-bearing generated by the disk 104 as it rotates in the direction of arrow 130. Only one disk surface with associated slider and recording head is shown in FIG. 1, but there are typically multiple disks stacked on a hub that is rotated by a spindle motor, with a separate slider and recording head associated with each surface of each disk.

Figure 2:
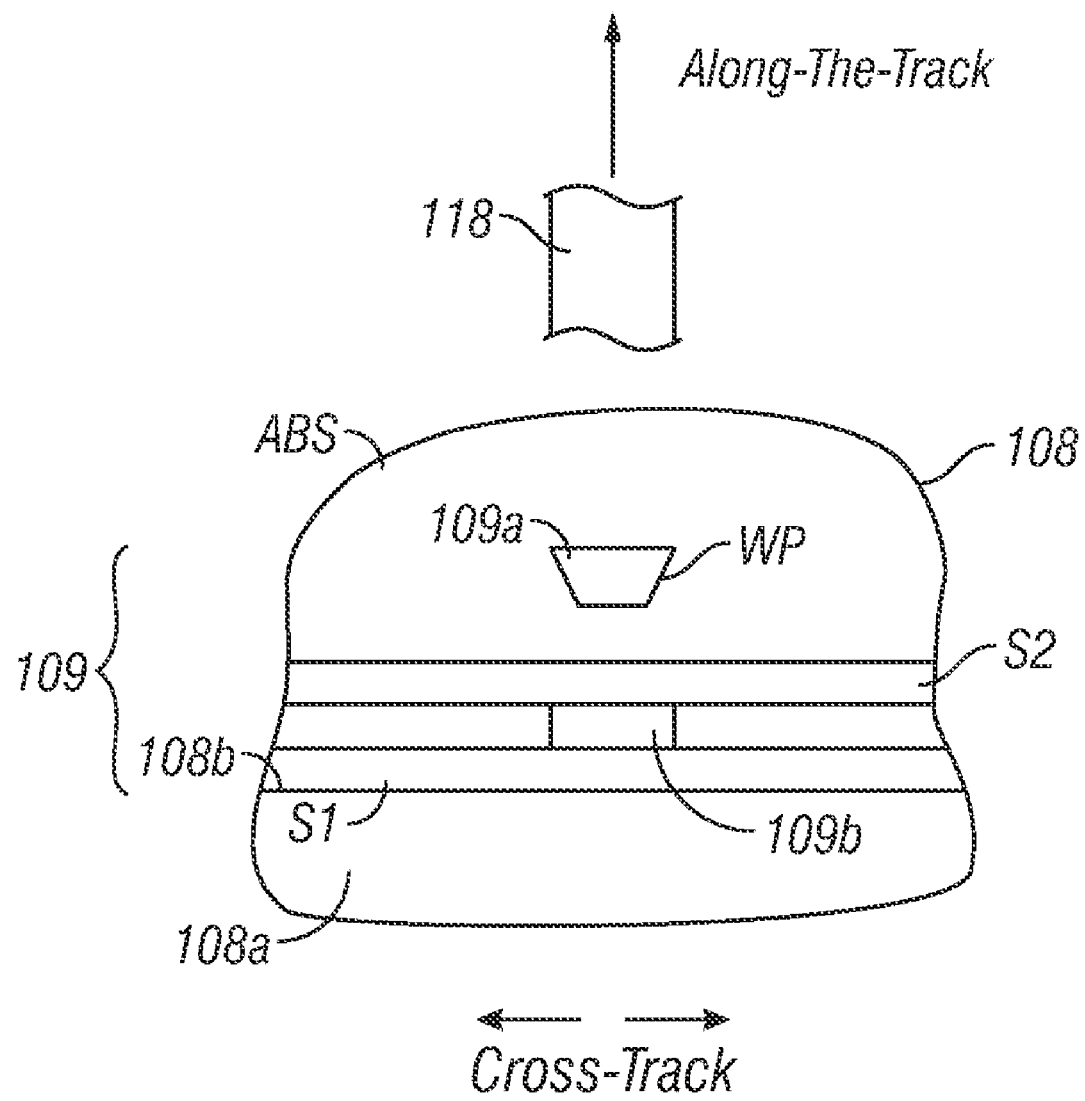
FIG. 2 is a view showing the disk-facing surface of the disk drive slider with the ends of the read/write head and a portion of a data track as viewed from the surface of the disk.

FIG. 2 is a view showing the disk-facing surface 108a of slider 108 and the ends of head 109 as viewed from the surface of disk 104 superimposed with a portion of data track 118.

The head 109 is a read/write head and is a series of thin films deposited and lithographically patterned on the end face 108b of slider 108. The write head 109a includes a perpendicular magnetic write pole WP that records magnetizations perpendicular to the recording layer on disk 104. The write head 109a may also include trailing and/or side shields (not shown). The read head 109b is located between two magnetic shields S1 and S2. The shields S1, S2 are formed of magnetically permeable material and may also be electrically conductive so they can function as the electrical leads to the read head 109b.

Referring again to FIG. 1, the disk 104 has a center of rotation 111 and is rotated in direction 130. The disk 104 has a magnetic recording layer with radially-spaced concentric data tracks, one of which is shown as track 118. Each data track has a reference index 121 indicating the start-of-track. The disk drive is illustrated as a zone-bit-recording (ZBR) disk drive because the data tracks are grouped radially into a number of annular data bands or zones, three of which are shown as zones 151, 152 and 153, but the invention is fully applicable to a disk drive that does not use ZBR, in which case the disk drive would have only a single data zone. Within each zone, the tracks are also circumferentially divided into a number of data sectors, such as typical data sectors 164 in the radially outer data zone. Each data sector 164 is preceded by a synchronization (sync) field, such as typical sync fields 163. The sync fields 163 are detectable by the read head for enabling synchronization of reading and writing the data bits in the data sectors 164.

Each data track also includes a plurality of circumferentially or angularly-spaced servo sectors 120 that contain positioning information detectable by the read head for moving the head 109 to desired data tracks and maintaining the head 109 on the data tracks. The servo sectors in each track are aligned circumferentially with the servo sectors in the other tracks so that they extend across the tracks in a generally radial direction, as represented by radially-directed servo sectors 120. The servo sectors 120 have a generally arcuate shape in the generally radial direction that generally replicates the path of the head 109 as it is moved across the disk by the radial actuator 110. The servo sectors 120 are nondata regions on the disk that are magnetized once, typically during manufacturing or formatting of the disk, and are not intended to be erased during normal operation of the disk drive.

The electronics associated with disk drive 100 include read/write (R/W) electronics 113, servo electronics 112, controller electronics 115 and interface electronics 114. In the operation of disk drive 100, the R/W electronics 113 receives signals from head 109 and passes servo information from the servo sectors 120 to servo electronics 112 and data signals from the data sectors 164 to controller electronics 115. Servo electronics 112 uses the servo information to produce a current at 140 that drives VCM actuator 110 to position head 109. Interface electronics 114 communicates with a host system (not shown) over interface 172, passing data and command information. Interface electronics 114 also communicates with controller electronics 115 over interface 174. In the operation of disk drive 100, interface electronics 114 receives a request for reading from or writing to the data sectors 164 over interface 172. Controller electronics 115 receives a list of requested data sectors from interface electronics 114 and converts them into a set of numbers that uniquely identify the disk surface, track and data sector. The numbers are passed to servo electronics 112 to enable positioning head 109 to the appropriate data sector.

If the disk drive is a "headerless" architecture disk drive, meaning that the data sectors 164 do not contain unique data sector addresses that are required to be read before data can be read from or written to the data sectors, then once the servo electronics 112 has positioned head 109 over the appropriate data track, servo electronics 112 begins executing sector computations to locate and identify the desired data sector. In brief, in the headerless architecture approach, a servo timing mark (STM) at the beginning of the servo sectors 120 is used to locate servo sectors, and a count of STMs from a servo sector containing an index mark 121 uniquely identifies each servo sector. Once the desired data sector is thus identified, the sync field preceding that data sector is detected to control the timing of data bits read from the data sector or data bits written to the data sector.

Conventional magnetic recording disk drives use disks with "continuous" media, meaning that the magnetic recording layer is a continuous film of magnetizable material. In conventional continuous-media disks the concentric data tracks are not physically separated from one another and are not pre-formed in the recording layer, but are formed when the write fields from the write head create the magnetizations in the continuous magnetic layer. A continuous-media disk may also be a "discrete-track" disk, meaning that the concentric data tracks of continuous magnetic material are radially separated from one another by concentric nonmagnetic guard bands. Discrete-track magnetic recording disks are known in the art, as described for example in U.S. Pat. No. 4,912,585. In a discrete-track disk, the nonmagnetic guard bands may be trenches or grooves, or formed of nonmagnetic material, or contain magnetic material but have surfaces far enough below the surfaces of the data tracks to not adversely the readback signals from the data tracks.

However, magnetic recording disks with "patterned" media have been proposed to increase the data density. In patterned media, the magnetizable material on the disk is patterned into small isolated islands such that there is a single magnetic domain in each island or "bit". The single magnetic domains can be a single grain or consist of a few strongly coupled grains that switch magnetic states in concert as a single magnetic volume. This is in contrast to conventional continuous media wherein a single "bit" may have multiple independently switched magnetic particles or grains separated by nonmagnetic grain boundaries. To produce the required magnetic isolation of the patterned islands, the magnetic moment of the spaces between the islands must be destroyed or substantially reduced so as to render these spaces essentially nonmagnetic. In patterned media, the data sectors as well as the nondata regions are patterned. However, it is also possible to fabricate a continuous-media disk wherein just the nondata regions are patterned. This type of continuous-media disk may have either conventional concentric data tracks, or discrete data tracks separated by nonmagnetic guard bands, but the nondata regions are patterned. An example of a discrete-track disk with patterned servo regions is described in U.S. Pat. No. 4,912,585.

Figure 3:
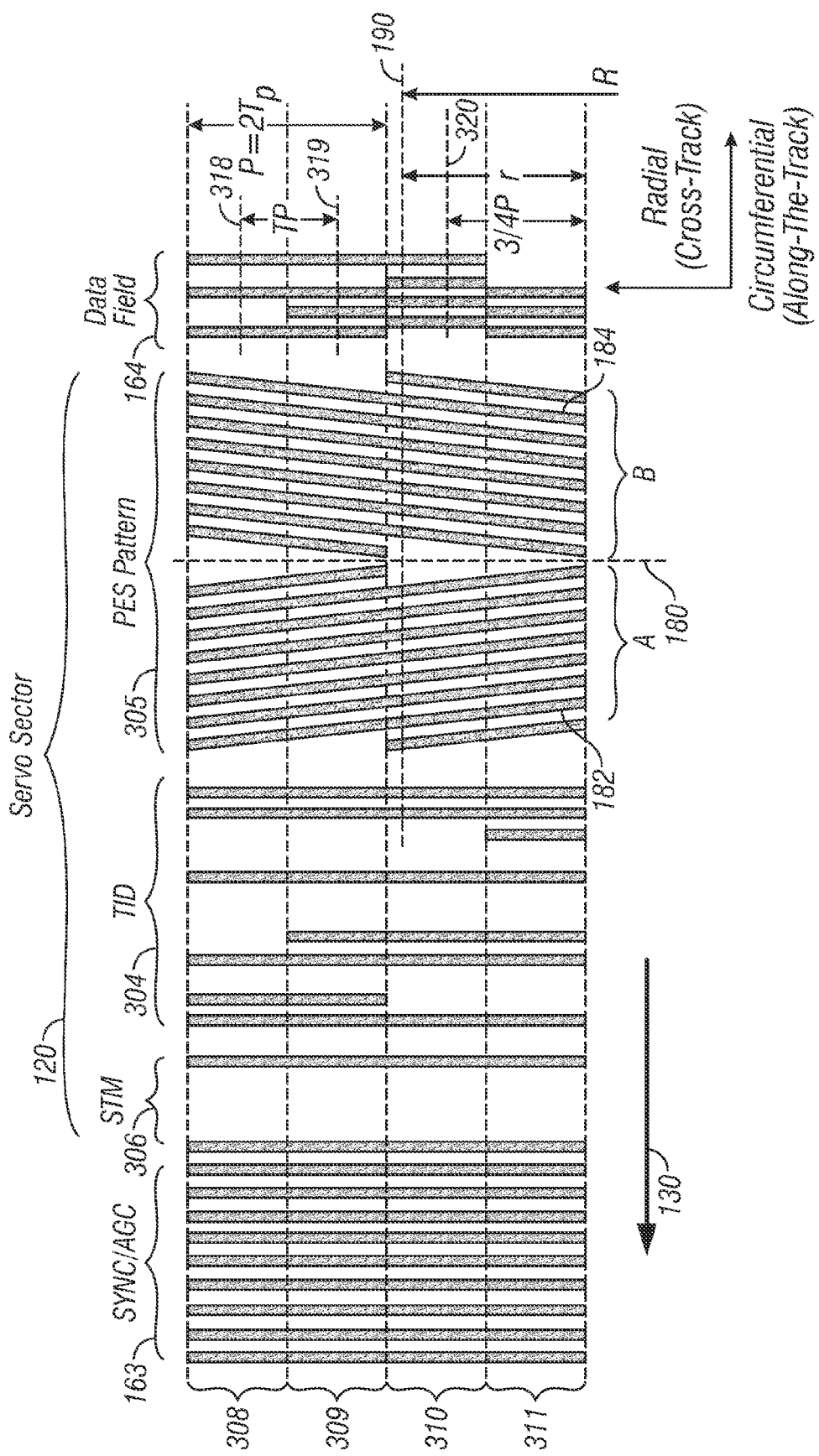
FIG. 3 is an illustration of a portion of a patterned-media disk with a patterned sync field and a patterned servo sector spanning several data tracks and showing the TID field and a PES field made up of two chevron patterns.

FIG. 3 is a schematic of a portion of a disk 104 showing a sync field 163, a servo sector 120 and a portion of a data sector 164. FIG. 3 shows a greatly simplified pattern for clarity with only four data tracks (tracks 308, 309, 310 and 311). The tracks have a track pitch Tp, as shown by the radial distance between centerlines 318, 319 of tracks 308, 309, respectively. The servo sector 120 precedes the data field 164 and moves relative to head in the direction shown by arrow 130. The two possible magnetic states of the medium are indicated as black and white regions.

The servo sector 120 is comprised of three distinct patterns: servo timing mark (STM) field 306, track identification (TID) field 304 and position error signal (PES) pattern 305. The STM field 306 is the same at all radial positions. The STM pattern is chosen such that it does not occur elsewhere in the servo pattern and does not occur in the data records. The STM is used to locate the beginning of the servo sector 120. The TID field 304 contains the track number, usually Gray-coded and written as the presence or absence of recorded dibits. The TID field 304 determines the integer part of the radial position of the head.

The position error signal (PES) pattern 305 is a conventional phase-type chevron servo pattern. The chevron pattern is made up of two fields or sets A, B of servo islands, with set B being the mirror image of set A about a radial line of symmetry 180. Each set extends generally radially across a plurality of data tracks, i.e., across the entire disk (or entire zone). The sets of islands extend in the generally radial direction across the disk and preferably have an arcuate shape that generally replicates the path of the head as it is moved across the disk by the radial actuator (as shown by servo sectors 120 in FIG. 1).

Each set A, B is a plurality of discrete radially-spaced servo islands. Each servo island, like typical islands 182 in set A and 184 in set B is generally parallelogram-shaped with its length slanted or oriented at an acute angle relative to the along-the-track direction. The islands in set A are slanted in the same direction at an acute angle to the track centerlines and the islands in set B are slanted in the opposite direction at the same acute angle. While in the example of FIG. 3 the islands in set A are slanted in the radially negative direction (toward the disk inside diameter) so that the islands in set B are slanted in the radially positive direction, the islands in the two sets could be slanted in the opposite directions. The two island shapes are congruent parallelograms, but they are placed in opposite orientation in the circumferential direction. Line symmetry is the radial line 180 that is perpendicular to the track centerline, so that the pattern of set B is the mirror image of the pattern of set A about line 180. In the example of FIG. 3, the period P of the chevron pattern, which is defined as the radial distance over which the pattern repeats, is equal to 2Tp, but the period P may be chosen to be another multiple of Tp, for example 4Tp.

As is well known in the art, in a servo system with a phase-type chevron pattern, the PES is determined by measuring the phase of the readback signal from the chevron pattern relative to a reference frequency. The phase of the readback signal from set A increases with radial direction while the phase of the readback signal from set B decreases with radial direction. The phase difference thus increases steadily in the radial direction before wrapping back to zero again after a distance equal to half the period (P/2) of the chevron pattern. The measured phase difference is the PES and is thus directly related to the relative position of the head within one period P of the chevron pattern. However, the TID is required to identify the closest data track for the head so that the absolute radial position of the head can be determined. For example, if the head is located on line 190 in FIG. 3, the signal from TID field 304 is decoded to determine that the head is located within track 310 and to locate the radial position of the centerline 320 of track 310. The signal from the chevron pattern 305 is decoded to obtain the measured phase difference to determine the relative radial distance r within one period of the chevron pattern. Since the centerline 320 is located at (¾)P within one period of the chevron pattern, then in this example the absolute radial head position R of line 190 is the radial position of centerline 320 plus [r−(¾)P].

The disk drive of this invention has a phase-type PES pattern comprising a plurality of circumferentially-spaced chevron patterns and servo electronics that decode the pattern to determine the absolute radial position of the head. Thus a TID field and associated decoding electronics is not required. The first chevron pattern (preferably the first one to be read by the head) has a radial period P1 and each of the other chevron patterns has a period which is a unique multiple of P1. Preferably, each successive chevron pattern has a period that is greater than the period of the pattern immediately preceding it such that the period of each chevron pattern progressively increases.

Figure 4A:
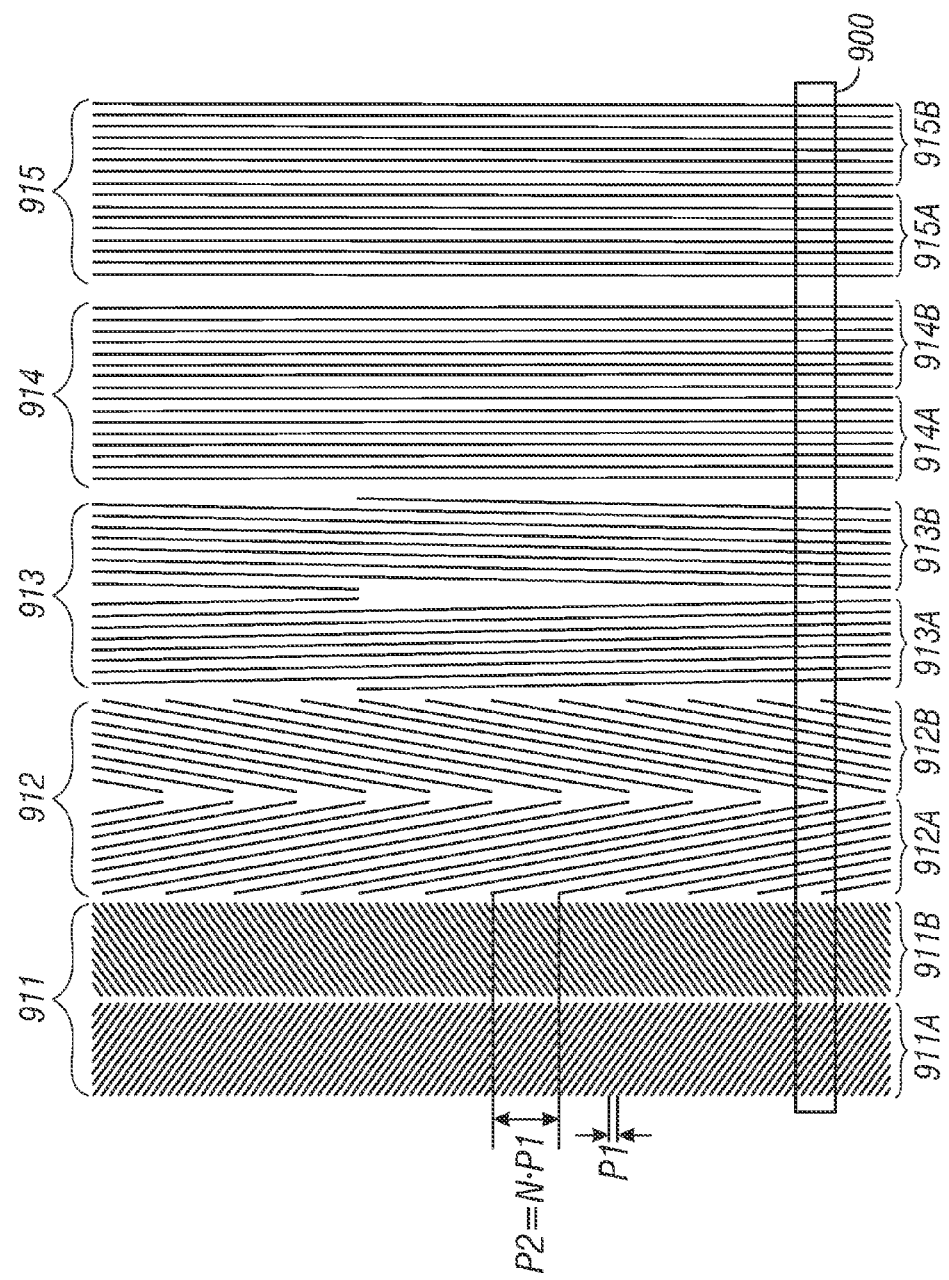
FIG. 4A shows a first embodiment of the servo pattern of this invention with five chevron patterns, wherein the period of each chevron pattern is a fixed integer N times the period of the chevron pattern immediately preceding it.

FIG. 4A shows a first embodiment of the PES pattern according to the invention. There are five chevron patterns 911, 912, 913, 914 and 915, each with fields or sets A and B, like sets 911A and 911B for chevron pattern 911. Sets A and B in each chevron pattern are mirror images of each other about a radial line between the two sets, like radial line 180 in FIG. 3. The five chevron patterns 911-915 function as the PES pattern 305 in the prior art of FIG. 3 and eliminate the requirement for a separate TID field 304, which is required in the prior art of FIG. 3. The first chevron pattern 911 is depicted with a radial period P1 extending over 96 periods. The period P1 is preferably equal to an integer multiple of Tp, preferably 4Tp or 2Tp. The period of each chevron pattern is a fixed integer N times the period of the chevron pattern immediately preceding it, and in this example N=8. Thus chevron patterns 912, 913, 914 and 915 have periods that are unique integer multiples of P1, specifically 8, 64, 512 and 4096 times greater than the period P1 of chevron pattern 911. Thus the general case for the embodiment of FIG. 4A can be described as wherein the period of each of the chevron patterns other than the first chevron pattern has a period $Pj=P1*N^{(j-1)}$, where N is an integer and j is 2 or greater and is the number of the chevron pattern.

Figure 4B:
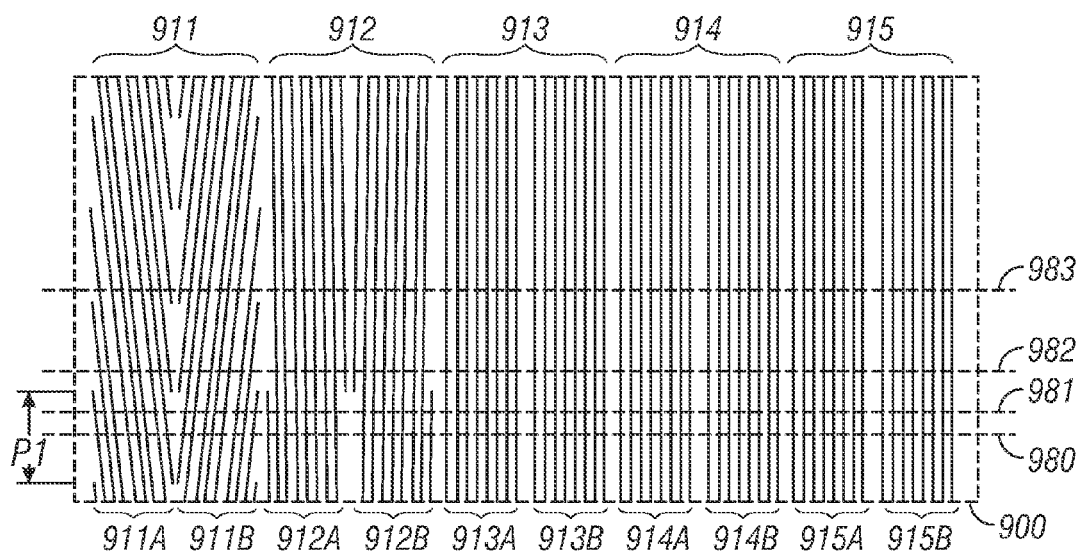
FIG. 4B shows a radially expanded section of the servo pattern of FIG. 4A.
Figure 4C:
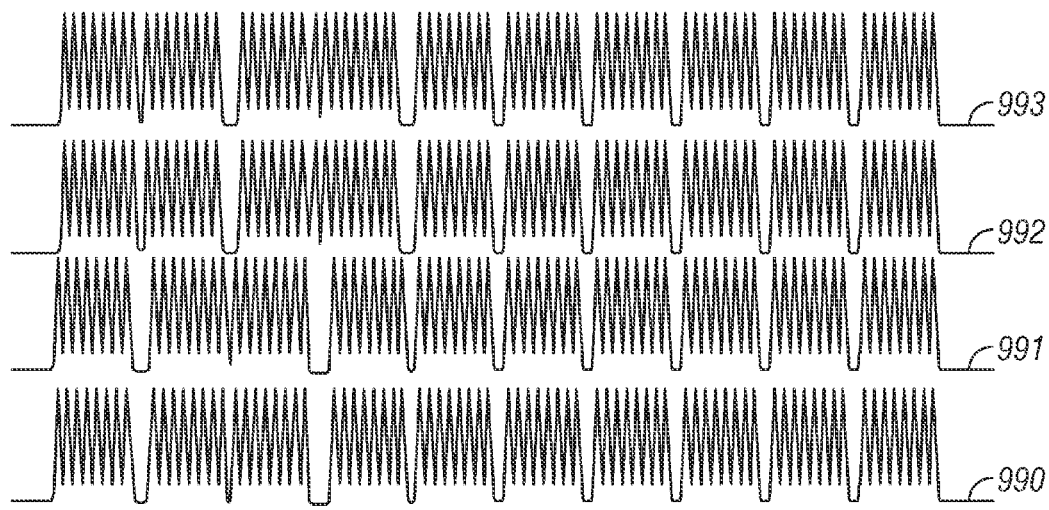
FIG. 4C shows the sinusoidal waveforms of the readback signals as the head passes over the chevron patterns along the lines shown in FIG. 4B.

FIG. 4B shows the radially expanded section 900 of FIG. 4A. This section 900 extends over slightly more than 4 periods P1 of the first chevron pattern 911. FIG. 4C shows the sinusoidal waveforms 990-993 of the readback signals as the head passes over the chevron patterns 911-915 along lines 980-983 in FIG. 4B, respectively.

Figure 5:
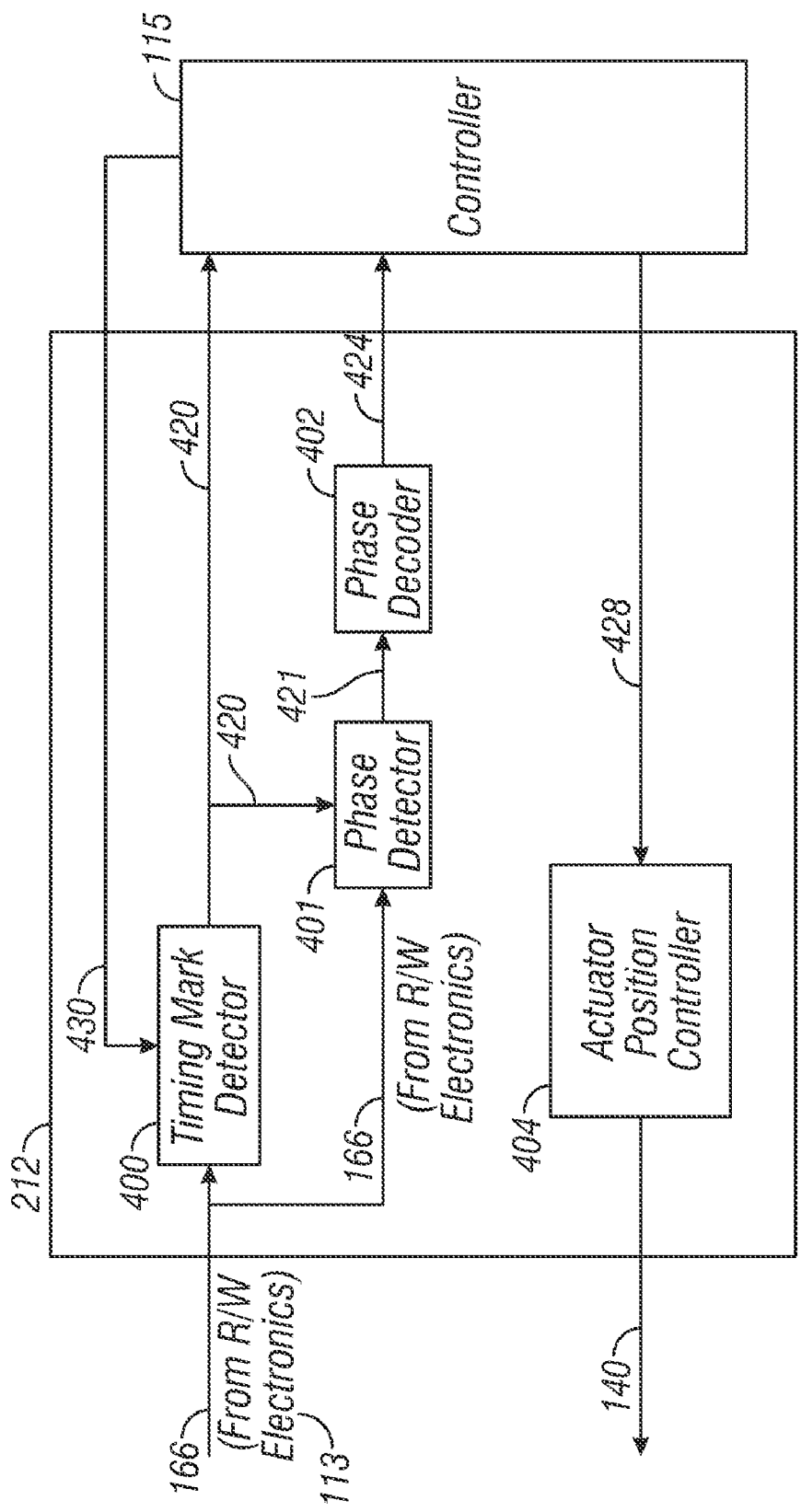
FIG. 5 is a block diagram of the servo electronics for the disk drive of this invention.

FIG. 5 is a block diagram of the servo electronics 212 for the disk drive of this invention. In operation, controller electronics 115 provides input 428 to actuator position control 404, which in turn provides a signal 140 to the actuator to position the head. The controller electronics 115 uses the servo information read from the servo sectors to determine the input 428 to the actuator position control 404. The servo information is read by the read/write electronics 113 (FIG. 1), and signals 166 are input to the servo electronics 212. Servo timing mark (STM) detector 400 receives a stream of readback signal sample values 166 as input from the read/write electronics 113, and a control input 430 from the controller electronics 115. Once a timing mark has been detected a gate signal 420 is generated. This gate signal 420 is used to control the sequence of phase measurements in the plurality of chevron patters 911-915.

After detection of a timing mark, the phase detector 401 analyzes the readback signal values 166 and then passes the measured phase values 421 to phase decoder 402. The phase decoder converts these phase measurements into an estimate of the head position 424. The head position value 424 is the absolute radial position of the head and is composed of a fractional PES, corresponding to the relative position of the head within the data track, and the radial position of the data track.

Figure 6A:
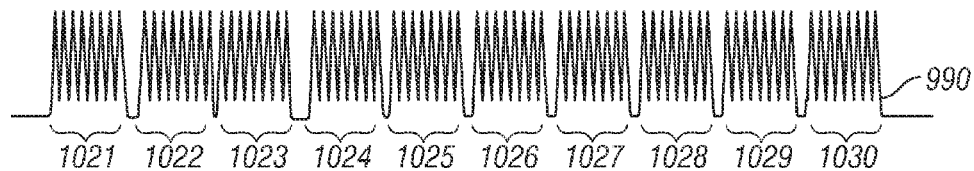
FIG. 6A shows the readback signal produced by the head as it passes over the five chevron patterns along one line shown in FIG. 4B.
Figure 6B:
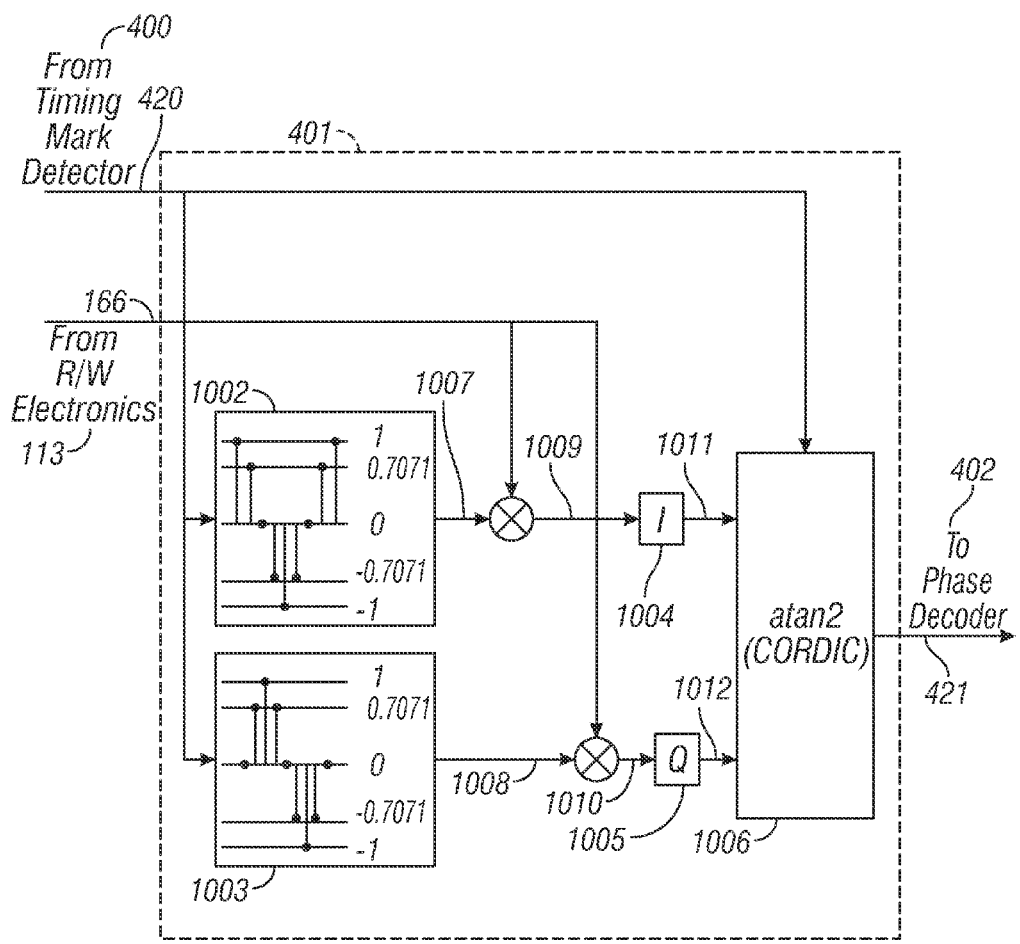
FIG. 6B is a block diagram of the phase detector for detecting the phases of the readback signals from each of the of the chevron patterns for the disk drive of this invention.

FIG. 6A is the readback signal 990 produced by the head as it passes over the five chevron patterns 911-915 along line 980 in FIG. 4B, and FIG. 6B is a block diagram of the phase detector 401 for detecting the phases of the readback signals from each of the sets A, B of the chevron patterns 911-915. This readback signal 990 is subdivided into 10 bands 1021-1030 representing the sinusoidal signals from the sets A, B of the five chevron patterns 911-915. The adjacent bands 1021-1030 are separated by narrow guard bands. The phase detector 401 measures the phase of each of these 10 sinusoidal signals relative to a reference frequency. The sampled readback signal 166 is multiplied by locally generated cosine 1007 and sine 1008 reference sequences generated by circuits 1002 and 1003, respectively. The locally generated cosine 1007 and sine 1008 sequences have a frequency very close to the frequency of the sinusoidal readback signals 1021-1030.

The cosine-weighted signal values 1009 are accumulated in in-phase (I) register 1004 while sine-weighted signal values 1010 are accumulated in quadrature (Q) register 1005. For each of the ten bands the measured phase angle theta is calculated as theta=a tan 2(Q,I) where a tan 2 is the well known two-parameter arctangent function. The a tan 2 computation is efficiently computed in hardware using the recursive CORDIC algorithm. (CORDIC, for COordinate Rotation DIgital Computer, is a well-known simple and efficient algorithm to calculate hyperbolic and trigonometric functions.) The sequence of 10 measured phase values corresponding to the 10 bands 1021-1030 is output to the phase decoder 402. The generation of the cosine 1007 and sine 1008 reference sequences, the resetting and latching of the registers 1004 and 1005, and the computation of the phase values are all performed according to a fixed sequence triggered by the gate signal 420 from the timing mark detector 400.

Figure 7:
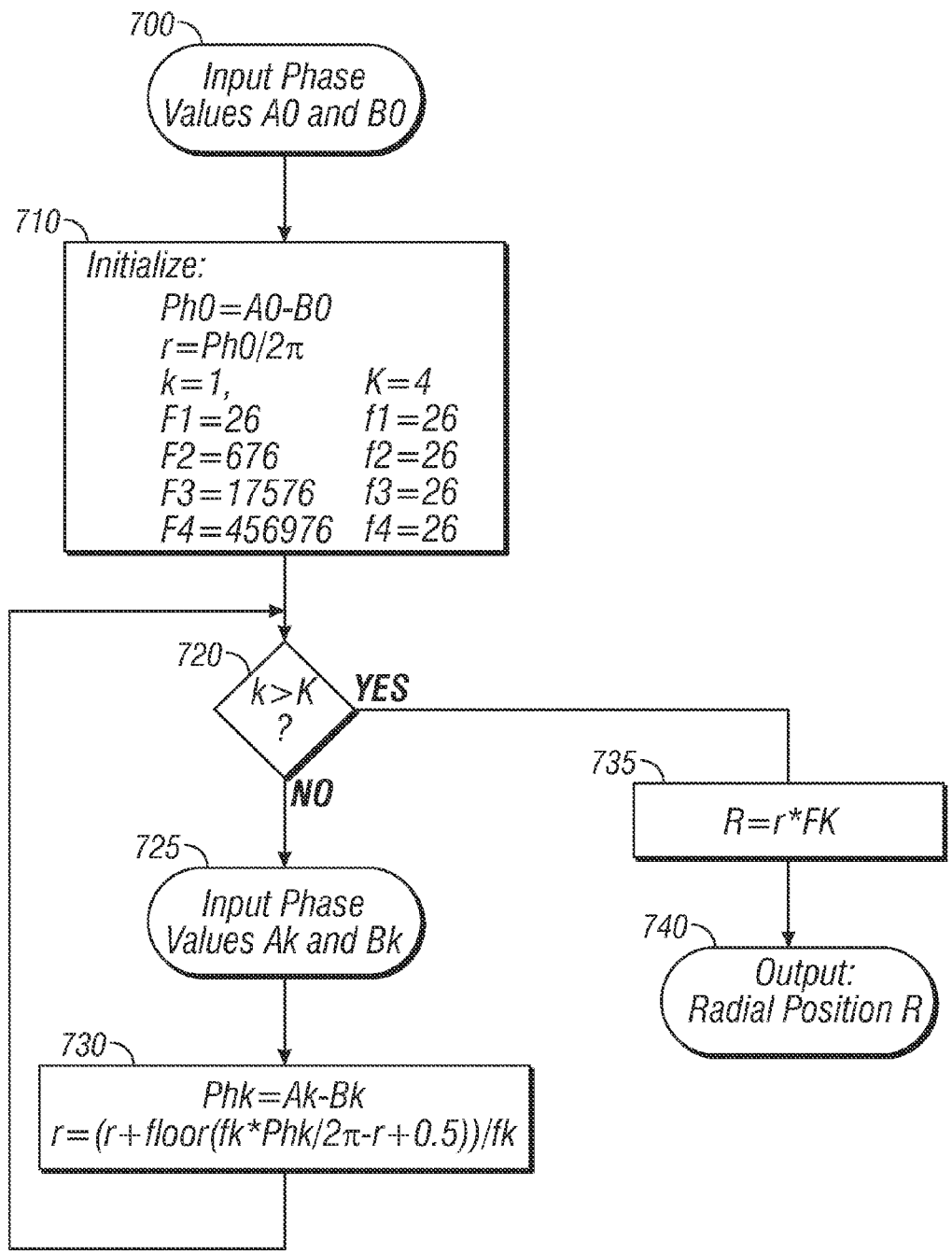
FIG. 7 is a block diagram of the method of decoding the servo pattern depicted in FIG. 4A.

The plurality of chevron patterns 911-915, wherein the period of each chevron pattern is the same integer multiple N (N=8 in the example of FIG. 4A) of the period of the chevron pattern immediately preceding it, is referred to here as the "hands-of-the-clock" pattern by analogy to the analog dial of a chronometer. FIG. 7 is a block diagram showing the method of decoding a hands-of-the-clock pattern. In this example there are a total of five chevron patterns with the period of each pattern being 26 (N=26) times greater than the immediately preceding pattern. The entire pattern repeats after approximately a half million tracks. In this description all angles are assumed to be stated in radians and the nominal track pitch Tp is equal to half the period of the first chevron pattern (P1=2Tp).

The first chevron pattern 911 is detected, and the two phase values A0 and B0 are measured at phase detector 401 and input to phase decoder 402 (block 700). At block 710 the first phase difference Ph0 is computed. The first phase difference Ph0 advances most quickly as the head moves radially across the disk. In the hands-of-the-clock analogy the first phase difference corresponds to the seconds hand. The phase difference Ph0 is converted into a value between zero and 1 by dividing by $2\pi$. The pattern counter k is set to a value of 1 and the maximum pattern number K is set to 4, corresponding to the number of chevron patterns after the first chevron pattern. The relative and absolute pattern periods f1-f4 and F1-F4, respectively, are initialized. Each of the relative periods f1-f4 is the value N, and F1-F4 correspond to the periods P2-P5 for the four chevron patterns 912-915 after the first chevron pattern 911. After the first phase difference Ph0 is calculated, the fractional off-track position of the head is known but the track on which the head is located is not known.

Decoding proceeds iteratively until k exceeds K (block 720), i.e., decoding stops when all five chevron patterns have been read. At each iteration the next two phase values Ak and Bk are input (block 725). After each iteration the radial position of the head modulo a larger and larger band of tracks is known. For example, at the end of the first iteration (k=1), i.e., after the second chevron pattern 912 has been read, the head position within a band of 26 tracks in chevron pattern 912 is known but it is not known which band of 26 tracks the head is located in. Similarly, at the end of the second iteration (k=2), i.e., after the third chevron pattern 913 has been read, the head position within a band of 676 tracks in chevron pattern 913 is known but it is not known which band of 676 tracks the head is located in.

At each iteration (block 730) a new phase difference Phk is calculated. The phase difference is corrected for the fractional position already known. The remaining phase difference corresponds to the number of times the previous pattern has rolled around since this current pattern last rolled around. At the end of each iteration r is equal to the fractional value expected on the next iteration. The operations in block 730 and 735 will now be described.

a. A value H1 is computed equal to the phase difference multiplied by fk and then divided by divided by $2\pi$:

$$H1 = fk * Phk/2\pi$$

b. A value H2 is computed equal to H1 minus r plus 0.5:

$$H2 = H1 - r + 0.5$$

c. A value H3 is computed equal to H2 rounded down to the largest integer value less than or equal to H2:

$$H3 = \text{floor}(H2)$$

d. A value H4 is computed equal to H3 plus r:

$$H4 = r + H3$$

e. A new value of r is calculated equal to H4 divided by fk:

$$r = H4/fk$$

After the final iteration, r is equal to the radial position of the head expressed as a fraction of the total period of the entire set of phase chevrons. In block 735 the radial position in tracks, R, is calculated as the product of r and FK. The value of R is then output (block 740) as output 424 to controller 115 (FIG. 5).

Figure 8:
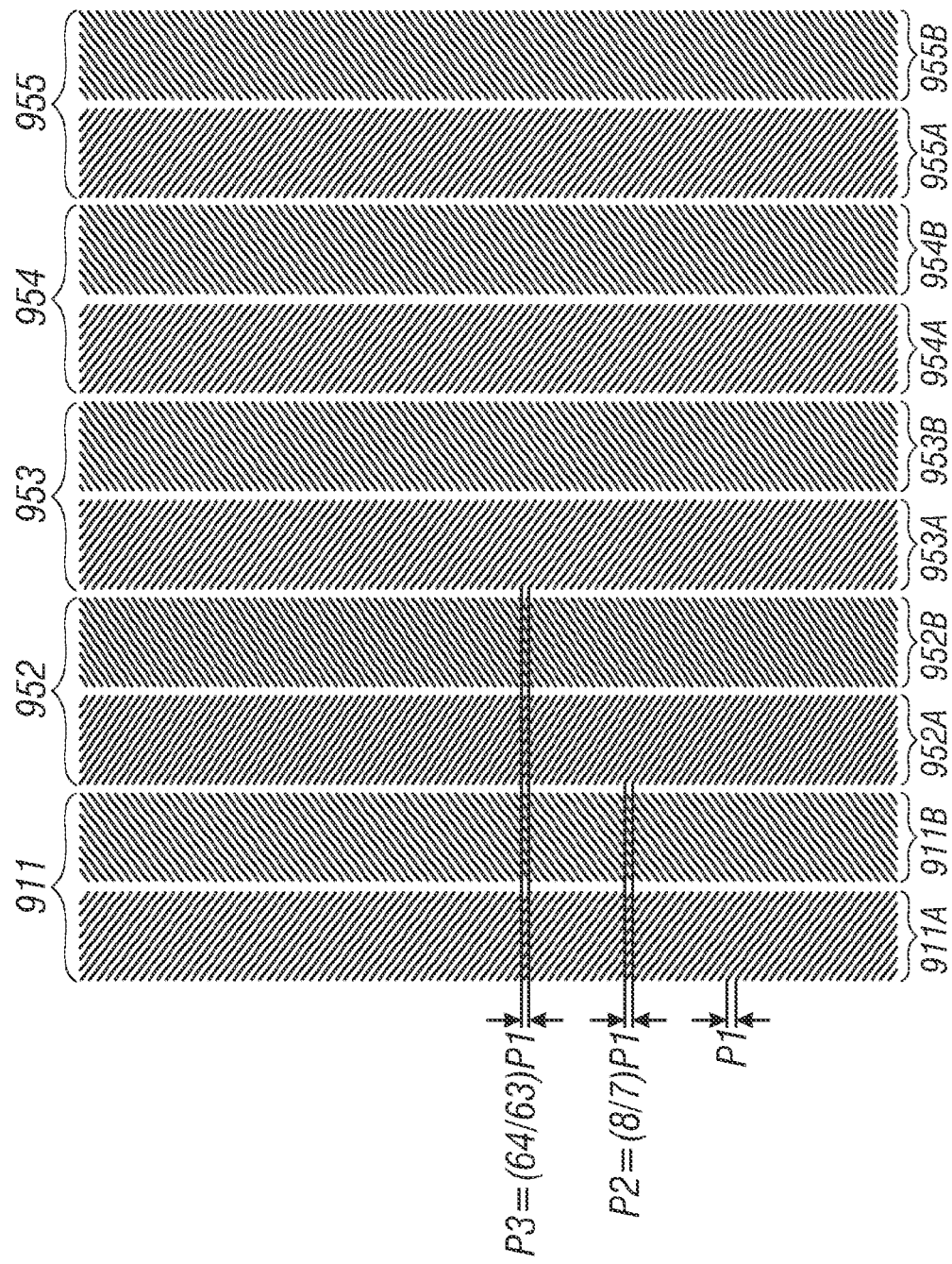
FIG. 8 shows a second embodiment of the servo pattern of this invention with five chevron patterns, wherein the chevron patterns following the first chevron pattern all have periods which are just slightly greater than the period of the first chevron pattern.

FIG. 8 shows a second embodiment of the servo pattern. This embodiment may be considered as a "harmonic" variation of the first embodiment by analogy to a harmonic drive gearbox. There are five chevron patterns 911, 952, 953, 954 and 955, each with fields or sets A and B, like sets 911A and 911B for chevron pattern 911, and shown as spanning 96 periods of the first chevron pattern 911. The first chevron pattern 911 is identical to the first chevron pattern 911 in the first embodiment shown in FIG. 4A. However, the subsequent chevron patterns 952-955 all have periods which are just slightly greater than the period P1 of the first chevron pattern 911. The phase difference of pattern 952 will increase a little slower than the phase difference of pattern 911. The phase discrepancy between the phase difference of pattern 952 and the phase difference of pattern 911 will increase steadily until eventually the phase difference of pattern 952 lags one complete cycle behind the phase difference of pattern 911 and the phase difference of the two patterns will then once again be equal. In this example the period P2 of pattern 952 is (8/7)P1 and where these integers 8 and 7 are relatively prime to one another, that is the integers share no factors in common. In this example, patterns 952-955 have periods that are respectively 8/7, 64/63, 512/511 and 4096/4095 times greater than the period P1 of pattern 911. Thus patterns 952, 953, 954 and 955 come back into phase with pattern 911 every 8, 64, 512 and 4096 tracks, respectively. An advantage of this servo pattern is that the periods of the individual chevron patterns are almost exactly the same. Thus the general case for the embodiment of FIG. 8 can be described as wherein the period of each of the chevron patterns other than the first chevron pattern is P1 times a ratio of two integers that share no factors in common. In the specific example of FIG. 8, each of the chevron patterns other than the first chevron pattern has a period $Pj = P1 * [(N^{(j-1)})/(N^{(j-1)}-1)]$ where N is an integer and j is 2 or greater and is the number of the chevron pattern.

Figure 9:
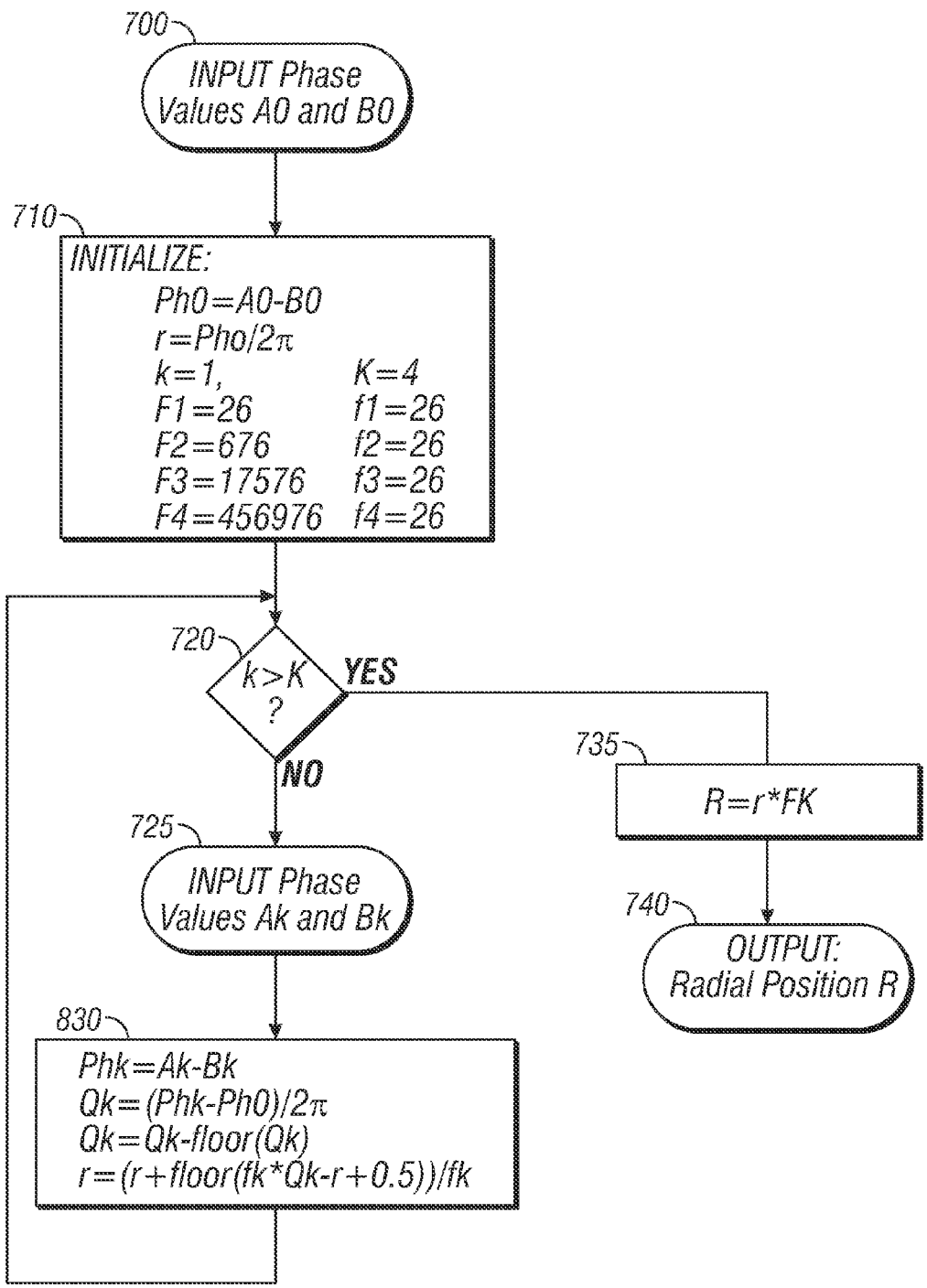
FIG. 9 is a block diagram of the method of decoding the servo pattern depicted in FIG. 8.

FIG. 9 is a block diagram showing the method of decoding the servo pattern of the type depicted in FIG. 8. The method is identical to the method of FIG. 7 for decoding the servo pattern of FIG. 4A except for the calculations described in block 830, which replaces block 730. In block 830, at each iteration the discrepancy Qk between the phase difference for that chevron pattern Phk and the phase difference for the first pattern Ph0 is computed. The computation continues as before using this phase discrepancy Qk rather than the phase difference itself At each iteration a new pair of phase values are read in (block 725) and a number of computations are performed. These computational operations in blocks 830 and 735 will now be described.

a. A value Phk is the difference between the measured phase values Ak and Bk:

$$Phk = Ak - Bk$$

b. A value J1 is computed as the difference between the phase difference Phk and the phase difference Ph0:

$$J1 = Phk - Ph0$$

c. A value J2 is computed as the value J1 divided by $2\pi$:

$$J2 = J1/2\pi$$

d. The phase discrepancy Qk is computed as the difference between the value J2 and the value of the largest integer value less than or equal to J2:

$$Qk = J2 - \text{floor}(J2)$$

e. A value H1 is computed equal to the phase difference multiplied by fk:

$$H1 = fk * Qk$$

f. A value H2 is computed equal to H1 minus r plus 0.5:

$$H2 = H1 - r + 0.5$$

g. A value H3 is computed equal to H2 rounded down to the largest integer value less than or equal to H2:

$$H3 = \text{floor}(H2)$$

h. A value H4 is computed equal to H3 plus r:

$$H4 = r + H3$$

i. A new value of r is calculated equal to H4 divided by fk:

$$r = H4/fk$$

Once all data has been read and processed the track position R is computed in block 735 by taking the product of r and the final track range FK. The value of R is then output (block 740) as output 424 to controller 115 (FIG. 5).

Figure 10:
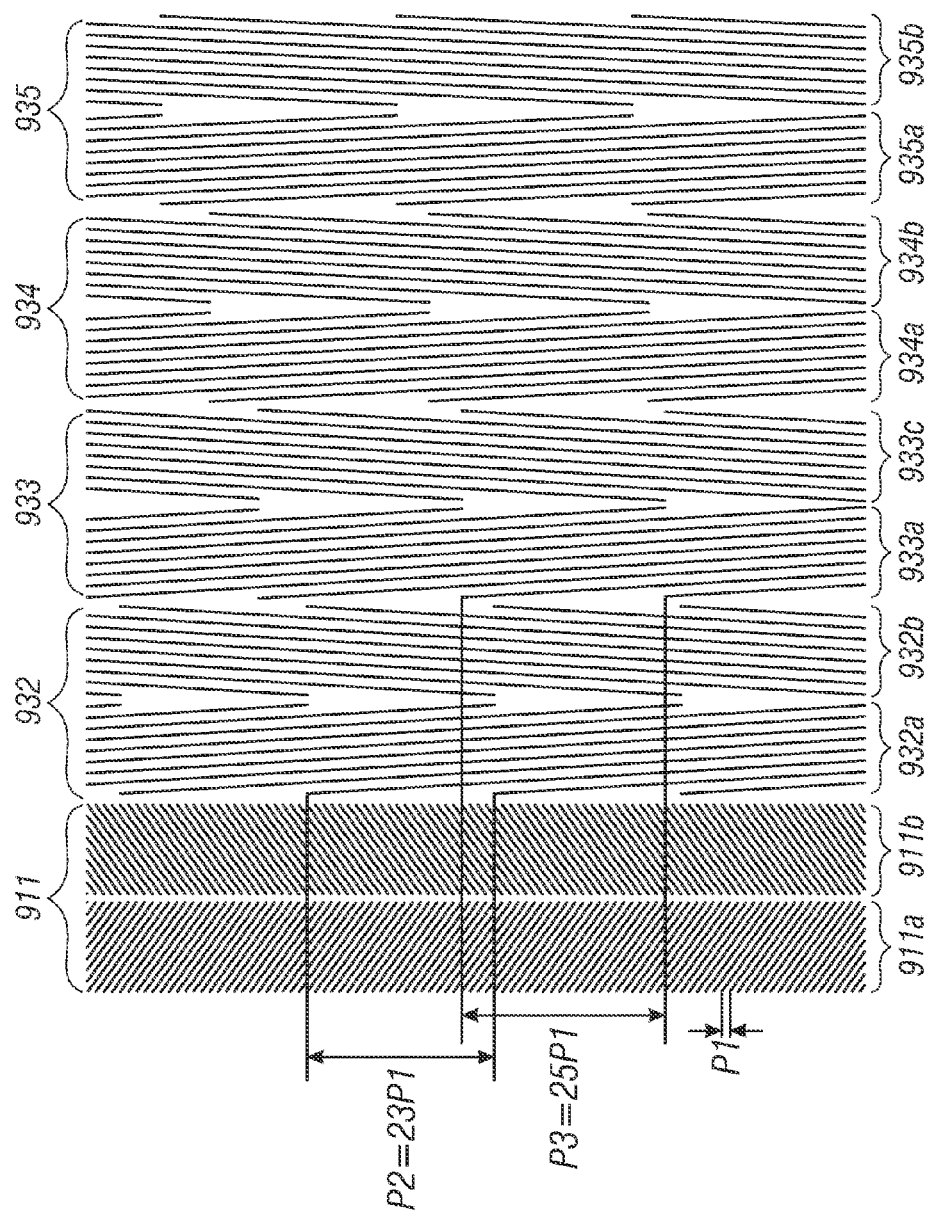
FIG. 10 shows a third embodiment of the servo pattern of this invention with five chevron patterns, wherein the chevron patterns following the first chevron pattern all have periods which are an integer multiple of the period of the first chevron pattern and where these integers are relatively prime to one another.

FIG. 10 shows a third embodiment of the servo pattern. There are five chevron patterns 911, 932, 933, 934 and 935, each with fields or sets A and B, like sets 911A and 911B for chevron pattern 911, and shown as spanning 96 periods of the first chevron pattern 911. The first chevron pattern 911 is identical to the first chevron pattern 911 in the first embodiment shown in FIG. 4A. However, the subsequent chevron patterns 932-935 all have periods which are a unique integer multiple of the period P1 of the first chevron pattern and where these integers are relatively prime to one another, i.e., these unique integers share no common factors. In this example, chevron patterns 932-935 have periods that are respectively 23, 25, 27 and 29 times greater than the period P1 of chevron pattern 911.

By decoding the phase difference of patterns 932-935 relative to the phase difference of the first chevron 911, the track number modulo a set of relatively prime integers is calculated. From the Chinese remainder theorem of Sun Tzu it is possible to reconstruct the track number from this information. The advantage of this "Chinese Remainder Theorem" servo pattern is that the periods of the chevron patterns 932-935 are relatively similar. There are no chevron patterns with very long patterns.

Figure 11:
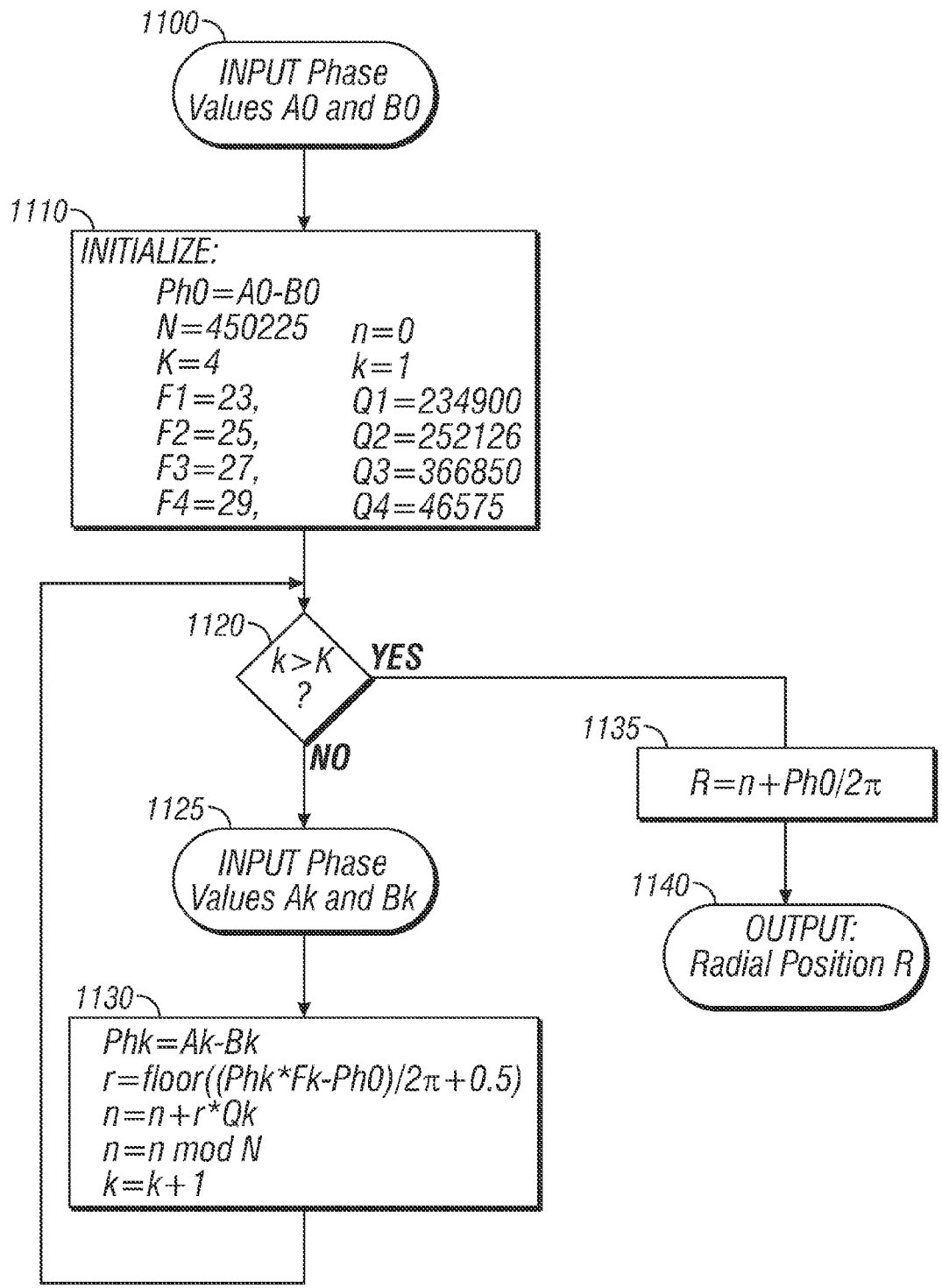
FIG. 11 is a block diagram of the method of decoding the servo pattern depicted in FIG. 10.

FIG. 11 is a block diagram showing the method of decoding the servo pattern of FIG. 10. The first chevron pattern 911 is detected, the two phase values A0 and B0 are measured at phase detector 401 and input to phase decoder 402 (block 1100). At block 1110 the first phase difference Ph0 is computed, and the absolute pattern periods F1-F4 and the values Q1-Q4 are initialized.

The values Q1-Q4 have the property that the remainder of Qn modulo Fn is equal to 1, but Fk divides exactly into Qn for all values of Fk except Fn. For example, consider Q1 in the example given in FIG. 11: Q1=234900=10213*23+1; thus the remainder of Q1 modulo F1 is 1. In addition, Q1=234900=9396*25=8700*27=8100*29; thus F2, F3, and F4 all divide exactly into Q1. Similarly, Q2=252126= 10962*23=10085*25+1=9338*27=8694*29, and so on.

For any relatively prime set of numbers Fn, a unique set of numbers Qn can be found that has the required properties. In most cases an exhaustive search of every positive integer less than N modulo each of the numbers Fn is practical. In this example every number between 1 and 450225 is examined and the remainder modulo 23, 25, 27 and 29 computed. Q1 is then selected as the number with remainder 1 modulo 23 and remainder 0 modulo 25, 27 and 29. Q2 is selected as the number with remainder 1 modulo 25 and remainder 0 modulo 23, 27 and 29. Q3 is selected as the number with remainder 1 modulo 27 and remainder 0 modulo 23, 25 and 29. Finally, Q4 is selected as the number with remainder 1 modulo 29 and remainder 0 modulo 23, 25 and 27.

The extended Euclidean algorithm can also be used find to the values Qn more efficiently. Given a pair of numbers a and b the extended Euclidean algorithm yields x and y such that ax+by is equal to the greatest common divisor of a and b. The recursive formulation of the extended Euclidean algorithm is given below for completeness:

a. If a is divisible by b, the algorithm ends and returns the trivial solution x=0, y=1.
   b. Otherwise, repeat the algorithm with b and a modulus b, storing the solution as x' and y'.
   c. Then, the solution to the current equation is x=y', and y=x' minus y' times quotient of a divided by b.

For example, Q1 can be computed using the recursive formulation of the extended Euclidean algorithm in the following manner. If a=F2*F3*F4=19575 and b=F1=23, then the recursive extended Euclidean algorithm proceeds as follows, where div and mod are the well known integer division and modulus after division respectively:

a. a0=19575, b0=23.
   b. Since 23 does not divide 19575 exactly, set a1=b0=23, set b1=mod(a0,b0)=2.
   c. Since 2 does not divide 23 exactly, set a2=2, set b2=mod(a1,b1)=1.
   d. Now 1 divides 2 exactly so set x2=0, set y2=1.
   e. Propagating backwards set x1=y2=1, set y1=x2−y2* div(a1,b1)=0−1*11=−11.
   f. Return x0=y1=−11 and y0=x1−y1*div(a0,b0)= 1−(−11)*851=9362.

The identity (−11)*19575+9362*23=1 has now been obtained (since F1 through F4 are relatively prime the greatest common divisor of a and b is 1). A solution is needed with a positive value of x and a negative value of y so by adding and subtracting a*b=F1*F2*F3*F4, an equivalent solution (23−11)*19575+(9362−19575)*23=1 is obtained. Then set Q1= (23−11)*19575=234900. Since F2*F3*F4 is a factor of Q1 it is known that the remainder of Q1 modulo F2, F3 and F4 is zero in each case, as required. Since Q1−10213*F1=1 it is known that the remainder of Q1 modulo F1 is 1, as required.

At each iteration a new pair of phase values are read in (block 1125) and a number of computations are performed. These computational operations in blocks 1130 and 1135 will now be described.

a. A value Phk is the difference between the measured phase values Ak and Bk:

$$Phk=Ak-Bk$$

b. A value J1 is computed as the product of the phase difference Phk and the period Fk:

$$J1=Phk*Fk$$

c. A value J2 is computed as the difference between J1 and the phase difference Ph0:

$$J2=J1-Ph0$$

d. A value J3 is computed as the value J2 divided by $2\pi$ plus 0.5:

$$J3=J2/2t+0.5$$

e. A value r is computed equal to J3 rounded down to the largest integer value less than or equal to J3:

$$r=\text{floor}(J3)$$

f. A value J4 is computed equal to the value of n plus the product of r and Qk:

$$J4=n+r*Qk$$

g. A new value for n is computed equal to the remainder of J4 divided modulo N:

$$n=J4 \bmod N$$

h. The counter k is incremented:

$$k=k+1$$

Once all data has been read and processed the track position R is computed (block 1135) by adding the fractional track offset Ph0/2π to the track number n. The value of R is then output (block 1140) as output 424 to controller 115 (FIG. 5).

The patterned servo sectors with the chevron patterns of discrete servo islands as described above according to this invention are preferably usable with patterned-media disks. However, the invention is not limited to patterned-media disks, but is also applicable to continuous-media disks with conventional continuous-media data tracks and patterned servo sectors, and to continuous-media disks with discrete data tracks separated by nonmagnetic guard bands and patterned servo sectors.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A magnetic recording disk comprising:
a recording layer of magnetizable material for the recording of data in a plurality of generally concentric circular data tracks, each track having a track centerline; and
a plurality of nondata servo sectors extending generally radially across a plurality of the data tracks, each of the servo sectors comprising a plurality of generally radially-directed circumferentially-spaced chevron patterns, each chevron pattern comprising a plurality of radially-spaced magnetized servo islands having a unique radial-spacing period; and
wherein the chevron pattern having the smallest period has a period P1, and each of said other chevron patterns has a unique period which is P1 times a ratio of two integers that share no factors in common.

2. The disk of claim 1 wherein the radially-spaced magnetized servo islands in each chevron pattern are arranged in two circumferentially-spaced sets of servo islands, the servo islands in a first set being oriented at a positive acute angle with the track centerlines and the servo islands in the second set being oriented at a negative acute angle with the track centerlines, wherein the absolute values of the positive and negative acute angles are equal.

3. The disk of claim 1 wherein the period of each of said other chevron patterns has a period $Pj=P1*[(N^{(j-1)})/N^{(j-1)}-1)]$ where N is an integer equal to or greater than 2 and j is 2 or greater and is the number of the chevron pattern.

4. The disk of claim 1 wherein the radial spacing between adjacent tracks is the track pitch (Tp), and wherein P1=2Tp.

5. The disk of claim 1 wherein the radial spacing between adjacent tracks is the track pitch (Tp), and wherein P1=4Tp.

6. The disk of claim 1 wherein the disk contains no track identification (TID) fields for identifying individual data tracks in said plurality of data tracks.

7. The disk of claim 1 wherein the servo islands are magnetized in a direction substantially perpendicular to the plane of the recording layer.

8. The disk of claim 1 wherein the data tracks are patterned into discrete data islands of magnetizable material separated by nonmagnetic spaces.

9. The disk of claim 1 wherein the data tracks are continuous magnetizable material of the recording layer.

10. The disk of claim 1 wherein the data tracks are discrete data tracks of continuous magnetizable material of the recording layer separated by concentric nonmagnetic guard bands.

11. A magnetic recording disk drive comprising:
a rotatable magnetic recording disk as in claim 1;
a write head that writes data in the data tracks;
a read head that reads data in the data tracks and detects the magnetized servo islands in the chevron patterns, the read head generating a readback servo signal from the servo islands as the disk rotates;
an actuator connected to the heads for positioning the heads to different data tracks and maintaining the heads on the tracks; and
servo electronics responsive to the servo signal for generating a control signal to the actuator, the servo electronics including a processor for calculating the phases of the readback signal from each of the chevron patterns and for calculating the control signal from said calculated phases.

12. A patterned-media magnetic recording disk comprising:
a plurality of generally concentric circular data tracks patterned into discrete data islands of magnetizable material separated by nonmagnetic spaces, each data track having a track centerline; and
a plurality of nondata servo sectors extending generally radially across a plurality of the data tracks, each of the servo sectors comprising a plurality of generally radially-directed circumferentially-spaced chevron patterns, each chevron pattern comprising a plurality of radially-spaced magnetized servo islands having a unique radial-spacing period and patterned in two sets of servo islands circumferentially-spaced about a generally radial line of symmetry, the first set being patterned with the servo islands slanted at an acute angle with the track centerlines and the second set being patterned as the mirror image of the first set about said radial line of symmetry; and
wherein the chevron pattern having the smallest period has a period P1, and each of said other chevron patterns has a period which is a unique multiple of P1, wherein the period of each of said other chevron patterns has a period $Pj=P1*[N^{(j-1)})/N^{(j-1)}-1)]$ where N is an integer equal to or greater than 2 and j is 2 or greater and is the number of the chevron pattern.

13. The disk of claim 12 wherein the radial spacing between adjacent data tracks is the track pitch (Tp), and wherein P1 is an integer multiple of Tp.

14. The disk of claim 12 wherein the disk contains no track identification (TID) fields for identifying individual data tracks in said plurality of data tracks.

* * * * *